US010742252B2

(12) United States Patent
Roessl

(10) Patent No.: US 10,742,252 B2
(45) Date of Patent: Aug. 11, 2020

(54) RADIO BASE STATION AND SYSTEM HAVING SAID RADIO BASE STATION

(71) Applicant: SES-IMAGOTAG GMBH, Graz (AT)

(72) Inventor: Andreas Roessl, Graz (AT)

(*) Notice: Subject to any disclaimer, the term of this patent is extended or adjusted under 35 U.S.C. 154(b) by 0 days.

(21) Appl. No.: 15/512,311

(22) PCT Filed: Sep. 23, 2014

(86) PCT No.: PCT/EP2014/070245
§ 371 (c)(1),
(2) Date: Mar. 17, 2017

(87) PCT Pub. No.: WO2016/045707
PCT Pub. Date: Mar. 31, 2016

(65) Prior Publication Data
US 2017/0279481 A1 Sep. 28, 2017

(51) Int. Cl.
*H04B 1/40* (2015.01)
*G08C 19/00* (2006.01)
(Continued)

(52) U.S. Cl.
CPC .............. *H04B 1/40* (2013.01); *G07F 11/002* (2013.01); *G08C 19/00* (2013.01); *G09F 3/208* (2013.01);
(Continued)

(58) Field of Classification Search
CPC ......... H04B 1/40; H04W 88/10; G08C 19/00; G06F 19/00; H04Q 7/24
See application file for complete search history.

(56) References Cited

U.S. PATENT DOCUMENTS 5,544,041 A * 8/1996 Nekomoto ........... G06Q 20/201
235/383
7,768,981 B1 * 8/2010 Donovan ............. H04J 3/0658
370/338
(Continued)

FOREIGN PATENT DOCUMENTS

EP 1798631 A2 6/2007
JP 2003167805 A 6/2003
(Continued)

OTHER PUBLICATIONS

Douglas E. Comer, Internetworking with TCP/IP vol. 1 Principles, Protocols, and Architecture, Third Edition, 1995 (Hereinafter Comer).*
(Continued)

*Primary Examiner* — Zhitong Chen
(74) *Attorney, Agent, or Firm* — Steven M. Shape; Dennemeyer & Associates, LLC

(57) ABSTRACT

The invention relates to a base station or a radio access point having a plurality of radio modules, of which one communicates with electronic price indication signs. If a plurality of radio modules use the same frequencies and communicate simultaneously, disturbances can occur in the form of interference. The invention solves this problem in that the radio modules (21, 22, 23) are coupled (24) such that a radio module (22) can influence another radio module (21, 23) with regard to the radio activity of said other radio module. In particular, the radio module that communicates with the electronic price indication signs (22) can silence the other radio modules (21, 23) by means of a radio activity control signal (FS).

10 Claims, 4 Drawing Sheets

(51) Int. Cl.
  *G07F 11/00* (2006.01)
  *G09F 3/20* (2006.01)
  *H04Q 5/22* (2006.01)
  *H04W 84/12* (2009.01)
  *H04W 88/10* (2009.01)
(52) U.S. Cl.
  CPC .............. *H04Q 5/22* (2013.01); *H04W 84/12* (2013.01); *H04W 88/10* (2013.01)

(56) References Cited

U.S. PATENT DOCUMENTS

| | | | |
|---|---|---|---|
| 2006/0133334 A1* | 6/2006 | Ross | H04W 72/1215 370/338 |
| 2010/0065634 A1 | 3/2010 | Nakamura | |
| 2010/0267339 A1* | 10/2010 | Lin | H04W 76/16 455/63.1 |
| 2011/0193679 A1* | 8/2011 | Okabe | G06Q 30/06 340/5.9 |
| 2014/0086156 A1 | 3/2014 | Kirchenbauer et al. | |
| 2014/0177604 A1* | 6/2014 | Lee | H04W 52/0212 370/336 |
| 2014/0249942 A1* | 9/2014 | Hicks | G07G 1/0081 705/17 |
| 2014/0336786 A1* | 11/2014 | Asenjo | G05B 19/4185 700/17 |

FOREIGN PATENT DOCUMENTS

| | | |
|---|---|---|
| JP | 2004179975 A | 6/2004 |
| JP | 2009159397 A | 7/2009 |
| JP | 2010122990 A | 6/2010 |
| JP | 2010278764 A | 12/2010 |
| JP | 2014123938 A | 7/2014 |
| WO | 2009009658 A1 | 1/2009 |
| WO | 2014024219 A1 | 2/2014 |

OTHER PUBLICATIONS

Douglas E. Comer, Internetworking with TCP/IP vol. 1 Principles, Protocols, and Architecture, Third Edition, 1995.*

"IEEE recommended practice for information technology—telecommunications and information exchange between systems—local and metropolitan area networks—specific requirements part 15.2: coexistence of wireless personal area networks with other wireless devices operating in unlicensed frequency ba", IEEE Standard; [IEEE Standard], IEEE, Piscataway, NJ, USA, Jan. 1, 2003 (Jan. 1, 2003), pp. 1-115, XP017601963 ISBN: 9780738137032.

Office Action issued in connection with Japanese Patent Application No. 2017-513763 dated Apr. 23, 2019.

* cited by examiner

RADIO BASE STATION AND SYSTEM HAVING SAID RADIO BASE STATION

TECHNICAL FIELD

The invention relates to a radio base station.

The invention also relates to a system having said radio base station.

BACKGROUND

A known communication system has, for example, two radio access points (radio base stations) for radio-based communication with a group of radio communication devices in each case. The two access points use the 2.4 Ghz band for their radio communication, so that in the communication between one of the access points and the radio communication devices associated thereto, interference can occur due to the other access point and its communication with the radio communication devices assigned thereto.

The known system is therefore prone to interference. The known system also causes high investment costs, because the different groups of radio communication devices each require one access point.

The object of the invention is to provide a system so that the problems discussed above are avoided.

SUMMARY OF THE INVENTION

This object is achieved by a radio base station according to the present disclosure. The subject matter of the invention is therefore a radio base station comprising a first radio module for radio communication with first radio communication devices assigned thereto, and (at least) one second radio module for radio communication with second radio communication devices assigned thereto, wherein the two radio modules are coupled to each other, and the one radio module is designed to influence the radio activity of the other radio module by means of the coupling and the other radio module is designed such that it can be influenced with regard to its radio activity.

This object is achieved furthermore by a system according to the present disclosure. The subject matter of the invention is therefore a system comprising a radio base station according to the invention, and a server, which is coupled to the radio base station, for providing or processing data relating to the communication with the radio communication devices.

The measures according to the invention are associated on the one hand with the advantage that, by combining or grouping the radio modules in the radio base station according to the invention, only a single common electrical or electronic component group (power supply, computer module, electrical and mechanical connections, etc.) is necessary. On the other hand, in the prior art a separate component group would be necessary for each radio base station. The same also applies in the figurative sense to the system components necessary for setting up a communication network with a server, such as LAN-cables, routers and switches etc. It therefore allows a much more convenient infrastructure to be implemented than is the case in the prior art.

Building on the coexistence of the radio modules which is now present can also create a further advantage however, which results from the coupling of the radio modules with each other and their ability to communicate with each other for the purpose of influencing the radio activity. The influence exerted on the radio activity of the other radio module means that mutual interference in the radio communication can be reliably prevented.

In accordance with a general aspect of the invention, each of the radio modules can gain priority over another radio module and thus communicate within its radio network free of interference. This can be decided by chance, and the particular radio module that influences the other first will receive priority over the other, until this condition is no longer needed. In accordance with a specific aspect of the invention, however—which is discussed in detail hereafter—it may be advantageous if only one of the radio modules is designed for influencing and only the other radio module is designed such that it can be influenced. As a consequence, only the radio module designed to influence can gain priority over the other radio modules. This then becomes advantageous if in the overall radio network implemented by the two radio modules, the radio network which is realized by means of the radio module designed for influencing should always be prioritized over the other radio network. This dominance of the one radio network over the other radio network can be necessary due to the nature of the deployment scenario or the application, and/or due to the nature of the radio modules and radio communication devices used.

In a radio base station according to the invention, either two or three, four or even more radio modules can be integrated or combined together. The radio modules can all be operated in accordance with a single radio standard or different radio standards or radio-communication protocols. Proprietary protocols can also be implemented. Likewise mixed systems with standardized and proprietary radio protocols can also be implemented.

Radio communications devices, in preparation for a user data communication, are or can be registered with the respective radio module and then assigned to the respective radio module. This allows each of the radio modules to form an individual radio network together with the assigned radio communication devices. The radio communication between the individual radio modules can take place e.g. over the freely available 2.4 Ghz band, or over any other freely available radio band.

The time at which the influencing occurs can be either freely selectable or defined by parameters of the particular radio protocol currently being used. The time of the actual response to the influence on the part of the influenced radio module, i.e. the occurrence of the influenced radio activity, can also correspond to this system of temporal behaviour. In addition, the duration of the influenced (adapted) radio activity can be freely selectable, or determined by the influencing radio module or specified by the radio module being influenced, or be derived from one or more parameters of the radio protocol which is used. Particularly preferably, the instant and the duration are defined by a parameter of the radio protocol being used in the influencing radio module, because this means that the special characteristics of the communication of the influencing radio module are optimally taken into account.

Further particularly advantageous designs and extensions of the invention arise from this detailed description.

In accordance with a further aspect of the invention the influencing radio module is designed to generate and output a radio activity control signal to the radio module which can be influenced, and the radio module which can be influenced is designed for receiving and evaluating the radio activity control signal with regard to its information content and for influencing its radio activity in accordance with the information content. The particular stage of the generator (in the radio module designed for influencing) for generating and outputting the radio activity control signal, or the detector stage (in the case of the controllable radio module) for receiving and detecting or processing the received radio activity control signal, can be implemented using the same type of hardware and/or software—e.g. processor and memory and additional analogue or digital circuit components or an application-specific integrated circuit (ASIC) as are used in the respective radio module for processing signals and/or data. In addition to these components, the respective radio module comprises an interface required for transmitting the radio activity control signal, which can be implemented separately or as a component of the ASIC. The special characteristics and usage possibilities of the radio activity control signal will be discussed in detail below.

The coupling between the radio modules can be implemented e.g. capacitively, if DC coupling is to be avoided. In principle, the coupling could also be implemented by means of a radio signal. It has proved particularly advantageous, however, to use a coupling between the radio modules which is implemented by an electrical cable or cabling system. This enables a signal transmission between the radio modules which is practically delay-free and in particular, immune to radio-signal based interference, such as radio signals from the radio modules themselves or other radio systems. In addition, any additional effect on the radio traffic between the radio modules and the respective radio communication devices due to the signal transmission of the radio activity control signal between the radio modules is reliably prevented.

A single cable can be of advantage when, in a simplest means of implementing the invention, only one signal with two level values is used as the information content for the purpose of influencing the other module. In this arrangement one level value (e.g. +2.5 Volt) can represent an influencing state and another level value (e.g., GND, or 0 Volt) can represent a non-affecting state.

A single cable can be advantageous, however, when more than two level states are used for information transmission to the other radio module or else, for example, a serial communication is implemented between the radio modules. This is advantageous when the aims is to achieve not only the influencing or non-influencing state, but other commands (control commands) as well as parameters or values are also to be transferred as information content. In this manner, such a data cable can be used for sending, e.g., control commands (e.g. with the meaning "mute other radio module x for 10 seconds") to individual or multiple radio modules, or also broadcasts to all radio modules (e.g. with the meaning "all other radio modules are now mute"). The same applies in a similar way to a cable system or bus system between the radio modules.

With regard to the influence exerted by the one radio module on the radio activity of the other radio module, a very wide range of options can be implemented, for which the particular information content is to be provided with the radio activity control signal, wherein combinations of the individual options can also be used.

For example, the radio module that can be influenced can be designed, e.g., to suspend its radio activity (muting). Its return to an active radio state can be effected automatically. It can however also be designed in such a way that it resumes its regular radio activity again due to a further influence and/or change in influence.

A facility can also be implemented in the controllable radio module whereby it suspends its radio activity during a predefined period of time or in accordance with a period of time defined by the influencing radio module. In the latter case, the influencing radio module must be designed to define the appropriate time period and to transmit this time period.

The controllable radio module can also be designed in such a way that to enable influencing to occur, it automatically adjusts (reduces) its transmission power to a predefined value or to a value defined by the influencing radio module. In the latter case, the influencing radio module must be designed to define the desired transmission power and to transmit the corresponding value of the transmission power.

Furthermore, the controllable radio module can be designed in such a way that it adapts its radio channel assignment according to a predefined scheme, or according to a scheme defined by the influencing radio module. In the latter case, the influencing radio module must be designed to define the desired channel assignment and to transmit the corresponding channel assignment scheme.

The particularly preferred application of the invention is in a radio network in which the other radio module, which can be influenced with regard to its radio activity, is designed for communicating according to a WLAN standard with WLAN-enabled radio communication devices or for communicating with electronic price indication signs as radio communication devices. Such radio modules tend to cause a radio traffic which is very difficult to predict, the influence of which on time-critical activities of the radio module which is designed to be influenced can be very serious. In addition to the above-mentioned types, other types of radio communication devices can also be used.

Particularly advantageous effects can be achieved with the invention if the one radio module designed for influencing is designed to communicate with electronic price indication signs as the second radio communication devices.

The previously mentioned electronic price indication signs can comprise an energy storage device, such as a battery or a solar panel coupled with a rechargeable battery, to supply their power. A display unit of such price indication signs can be implemented, for example, by means of LCD technology, preferably with electronic-ink technology (also known as E-ink as a synonym for electronic paper).

In order to operate as energy efficiently as possible, the price indication signs have different operating states. In an active state a price indication sign has a relatively high energy consumption. The active state is present, for example, when sending or receiving data, updating the display, measuring the battery voltage, etc. In a sleep state on the other hand, the energy consumption is relatively low. As many electronic components as possible are preferably disconnected from the power supply, or switched off or at least operated in a mode with minimal energy requirements. The active state is mainly present in the time slot assigned to the radio tag for communication with the communication station. In the active state, the price indication has a ready-to-receive status, in order to receive commands and possibly also reception data from the radio module and process it using its logic stage. In the active state, transmission data can also be generated by means of the logic stage and communicated to the radio module. In order to work energy-efficiently and thus to obtain the maximum service life of the price indication sign, the basic operating strategy consists in keeping the price indication sign in the sleep state for as long as possible and only to operate it in the active state for a minimum period of time when absolutely necessary, for the purpose of data transmission to the radio module.

In such price indication signs therefore, during a communication with the radio module there is always a relatively high energy consumption. Therefore, interference in this communication caused by another radio module, which inevitably leads to an unwanted lengthening of the communication period of the particular price indication sign with the associated radio module, have an extremely negative impact on the service life of the electronic price indication sign. The invention then enables for the first time the preference of the radio module used for communication with the electronic price indication sign, and therefore the reliable avoidance of interference in the radio traffic with the electronic price indication signs. Even if both radio modules (the influencing and the influenced) are implemented as radio modules designed for communication with the electronic price indication signs, the measures according to the invention enable any mutual interference in the radio traffic to be avoided. This can be achieved by a permanently predefined prioritization of the one radio module over the other. This can also be obtained, however, by a dynamic preference for one or the other radio module resulting from the particular situation or the particular communication requirements. In accordance with this implementation, the first influencing radio module can gain priority over the influenced radio module until priority is no longer required. The radio module which was previously influenced then has the option, at its own initiative, to obtain priority over the previously influencing radio module and to carry out its radio traffic undisrupted. The two radio modules are thus equally ranked with regard to the possibility of gaining priority. In all cases, each influencing radio module can carry out its communication with the highest efficiency, which makes a crucial contribution to sustainable conservation of the energy resources of the individual electronic price indication sign.

In accordance with a preferred aspect of the invention, in the communication with the electronic price indication signs a time-slot communication method is applied, in which a number of time slots are available for communication per time-slot cycle in a recurring sequence, wherein in particular each time slot is characterized by a unique time-slot symbol. In the context of this time-slot communication method, individual electronic price indication signs can be addressed and/or supplied with (command or display) data, and data from the price indication signs can also be received.

In the time-slot communication method, within a specific time period of n seconds, e.g. 15 seconds, m time slots, e.g. 255 time slots, are available for use. The n seconds form a time-slot cycle. In this time-slot communication method therefore, m time slots are available within a time-slot cycle for communication with the price indication signs. Each of the price indication signs can be assigned to one of the time slots, wherein one specific time slot can also be assigned a plurality of price indication signs. In a system in which, e.g. during one time-slot cycle of 15 seconds, 256 time slots each lasting 58.6 milliseconds exist, it is possible to easily address two to five price indication signs individually per time slot and to delegate individual tasks to them with a single command. Each price indication sign can acknowledge the conclusion (completion) of the executed command with confirmation data, which are preferably sent in the same time slot in which the command was received. Outside of the time slot allotted to the respective price indication sign, the price indication sign is primarily operated in the energy-saving sleep mode. In the sleep state, its logic stage or a time control stage carries out only those activities that are needed for the timing for timely wake-up, in order that the price indication sign is ready by the next time slot allotted to it for receiving the synchronization data signal, to establish its synchronous state and/or for communication with the radio module. A synchronous price indication sign is operated in its sleep state for as long as possible.

In this context it is particularly advantageous that the radio activity of the other radio module is always influenced when the influencing radio module either wants or needs to communicate a synchronization data signal comprising the time slot symbol or address data for addressing an electronic price indication sign, or command data for sending a command to an electronic price indication sign, or user data for processing in the electronic price indication sign (e.g. for indicating a price of a product or other product-related or price-related information) to the electronic price indication sign. It is also particularly advantageous that the radio activity of the other radio module is always influenced when the influencing radio module is expecting confirmation data from the electronic price indicator sign, or when the influencing radio module is expecting response data from the electronic price indication sign.

The duration of the radio activity which is influenced can be predefined or freely definable (e.g. by the influencing radio module). To ensure an efficient and reliable implementation of the invention, it is particularly advantageous if the duration of the influenced radio activity is aligned with the timing raster or time slot raster or with the system timing defined by the time-slot communication method. Specifically, this means that after being influenced by the influencing radio module, the influenced radio module adapts its radio activity during the actual communication of the influencing radio module with the relevant price indication sign. In particular, the time period of the adapted radio activity starts with a lead time period prior to the communication period, during which a communication takes place between the influencing radio module and an influenced electronic price indication sign. The adapted radio activity can be terminated at that point in time when the communication period ends. The duration of the adapted radio activity can however also cover a plurality of communication time periods, which in particular are closely adjacent. The existence of the adapted radio activity need not be restricted to a single time slot. It can also involve adjacent time slots, i.e. extending from a first time slot into a second time slot or further.

In principle, the influencing radio module can always exert an influence exactly at the time when it has a radio communication requirement. The controlled radio module must then adapt its radio activity accordingly, in response to the influence applied. It has proved particularly advantageous, however, if the one radio module which is designed for influencing is also designed to predictively determine the instant at which the influence occurs. In this way, it is always possible to promptly exert an influence which reliably gives rise to an interference-free radio communication. This is particularly advantageous because the radio module to be influenced also requires a certain response time in order to implement the influence exerted by the influencing radio module.

In accordance with a further, general aspect of the invention, the influence can also be effected using predefined rules, so that e.g. a dead-lock (when a radio module may no longer be connected) can be eliminated.

In accordance with a further aspect, it is advantageous if the time at which the influence occurs is specified on the basis of the expected time of a communication between a radio communication device and the radio module designed to be influenced. It is particularly preferred if the time at which the influence occurs is determined by taking account of the speed of response of the radio module to be influenced. Thus, the influence can take place at a time before the radio activity of the influencing radio module actually takes place.

Since the characteristic or timing of its radio protocol is known to the influencing radio module, the predictive determination can be relatively easily implemented directly in the radio module which is designed to exert the influence. There, it is no longer the case that the module waits only for the time the communication will occur and then simply communicates, but rather it now checks in advance when the next communication time will occur, and with an appropriate lead time performs the influence, so that this reliably exerts its effect at the time of the communication.

Against the background of the aspects of the invention discussed, in accordance with an exemplary embodiment it is possible, for example, for only two radio modules for communicating with a price indication sign to be integrated in a base station. Advantageously, the influence exerted can then be designed so that for both the price indication sign radio networks an optimized operation is ensured with regard to the energy requirements of the price indication signs. Concerning the aspects of energy-conserving operation of the price indication signs and effective communication in the radio network, it is possible for e.g. two separate radio modules for communication with price indication signs and e.g. two separate radio modules for communication with WLAN radio communication devices to be integrated in the base station. In this configuration, e.g. one of the price indication sign radio modules and one of the WLAN radio modules can operate in the 2.4 GHz band, while the other radio module can use the 5 GHz band.

The radio base station discussed can provide the entire intelligence and computing power that are required in order to enable the functionality of the respective radio module. Since a plurality of radio modules are integrated in the base station, this is effected by hardware with appropriate computing power, a powerful operating system, and also the appropriate software for controlling the different radio modules integrated in the particular base station as well as the data traffic with e.g., a server which is accessible over a wired network. The base station according to the invention therefore forms a combined access point for communication in different types of radio networks. The combined access point thus provides the properties and/or functions of different, individual access points, which are required for the communication with the relevant (assigned thereto) radio communication devices. However, in accordance with another exemplary embodiment of the invention, a substantial part of said intelligence and computing power can be off-loaded out of the base station, which will be discussed below.

In accordance with a further aspect of the invention, the radio base station comprises a host computer, which can be linked to a server via a wired computer network and is designed for exchanging data between the server and the radio modules, wherein the host computer is designed for transmitting data between the server and the host computer based on a network protocol, in particular the TCP/IP protocol, and between the radio modules and the host computer based on an interface protocol, in particular a serial interface protocol, and for tunnelling a raw data traffic between the radio modules and the server. With an appropriately powered host computer, this enables a plurality of radio modules integrated in the radio base to be easily served with data. In each of the radio modules the relevant radio protocol is preferably applied, in order to process the radio traffic with the relevant radio communication device.

Particularly preferably, the server is designed to implement a virtual instance of a radio base station, and the radio base station is designed to tunnel a raw data traffic between the radio modules and the virtual instance of the radio base station. In accordance with this particularly preferred solution, the entire intelligence and functionality normally attributed to a conventional radio base station, for example by using its operating system, can be off-loaded to a high-performance server. The radio base station according to the invention comprising its integrated radio modules communicates with the server by means of its host computer over a wired network, such as a local computer network (LAN for "local area network"), in which the host computer requires relatively low computing power. In the base station according to the invention, the host computer is now only used to convert the raw data received from the server, e.g. from the TCP/IP communication, to the interface available for the communication with the radio modules. This can be, for example, a parallel or a serial input/output interface, particularly preferably a "universal asynchronous receiver/transmitter" (UART) compliant interface. On the one hand, this achieves the advantage that the hardware of the base station according to the invention is relatively convenient to implement, because no high demands are placed on the functionality and performance level of the host computer. On the other hand, the existing resources on the server, which are sufficient in any case, are optimally utilized at the same time. The system is therefore optimized with regard to its resource distribution and usage. Another advantage is that a constant volume of data ("network traffic") can be realized in the system between the server and the radio base station according to the invention, which contributes significantly to the stability of the network. Unused data packets are assigned and transmitted with zero data. The system according to the invention behaves transparently to the outside world as a conventional system based on a conventional server and at least two or more separate, conventional radio base stations.

During the period of the adapted radio activity, it can happen that the communication between the influenced radio module and the radio communication device assigned thereto is interrupted. In order not to suffer a loss of raw data, in accordance with a general aspect of the invention, the raw data which have not yet been transmitted are cached and after the completion of the influenced radio activity the radio communication with the influenced radio communication device is continued, wherein the cached data is transmitted first and newly added raw data are also cached and only transmitted piece by piece. Depending on the implementation, the caching can either be effected directly in the relevant radio module, in the host computer of the base station or in the server.

These and other aspects of the invention are obtained from the figures discussed below.

BRIEF DESCRIPTION OF THE FIGURES

The invention is explained again hereafter with reference to the attached figures and on the basis of exemplary embodiments, which nevertheless do not limit the scope of the invention. In the different figures the same components are labelled with identical reference numbers. They show in schematic fashion.

DETAILED DESCRIPTION OF THE EXEMPLARY EMBODIMENTS

Figure 1:
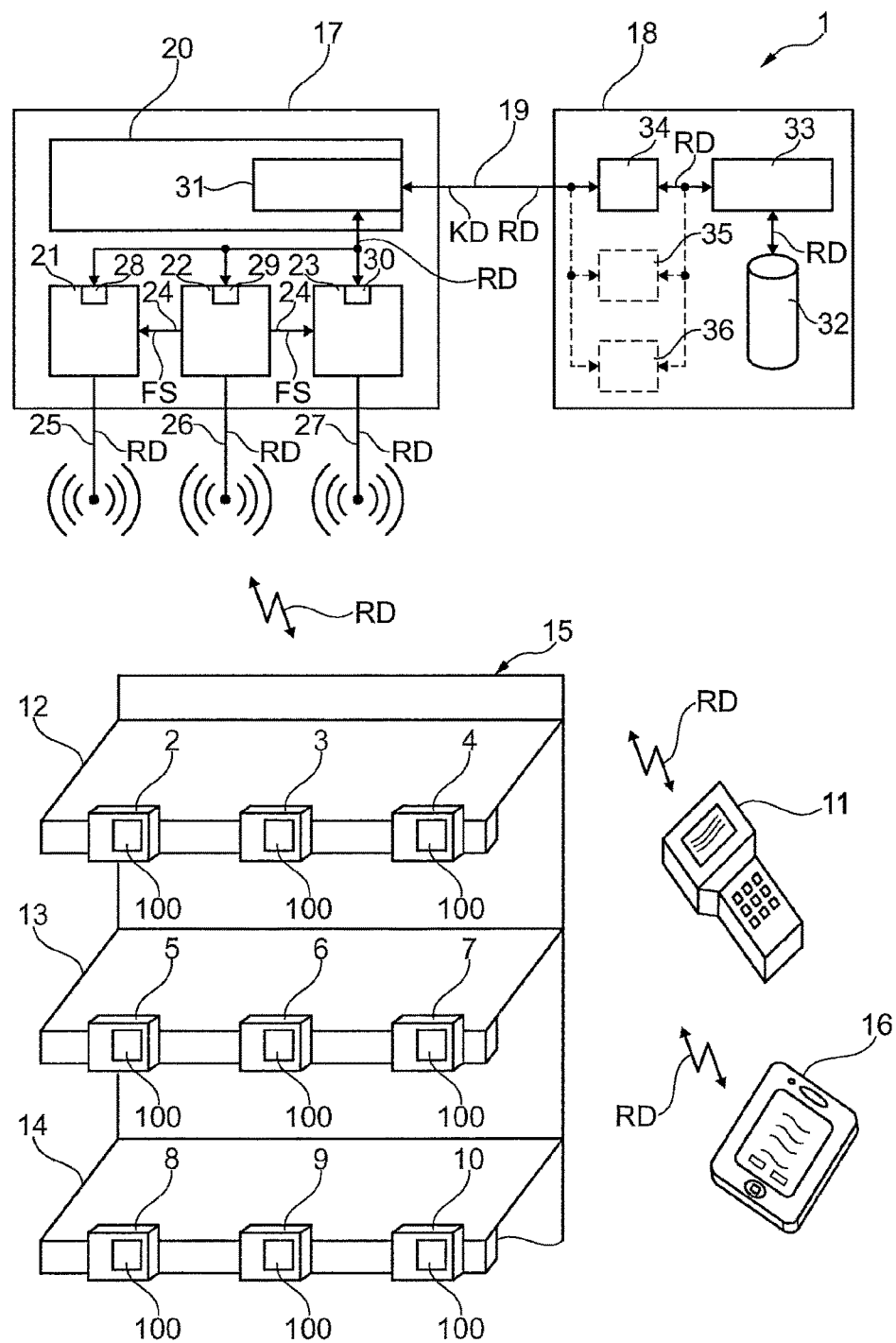
FIG. 1 a system according to the invention.

FIG. 1 shows a system 1 according to the invention for radio communication with different radio communication devices, which is installed on the premises of a supermarket. The system 1 implements a radio network and enables the radio communication with a set of electronic price indication signs 2-10, hereafter referred to in short as ESL 2-10, as well as portable electronic barcode reading devices 11 (only a single one is shown), which are part of an electronic stock management system of the supermarket. Each ESL 2-10 has a display unit 100 and is mounted on shelves 12-14 of a shelf unit 15 corresponding to products (not shown) positioned on the shelf, price and product information relating to which is displayed using the ESL. In addition, customers of the supermarket, using their own mobile radio communication devices (also only one shown), such as mobile phones or portable computers, hereafter designated in short as user devices 16, can use on-line services via a guest access to the radio network of the supermarket. The radio network enables communication with the different groups of radio communication devices 2-10, 11, 16 with different protocols and different priority.

In order to implement this radio network, the system 1 comprises a radio base station 17, hereafter designated in short as station 17), and a server 18, which are connected to each other via a local-area, wired network (LAN) 19. Via this LAN 19 the server 18 communicates with the station 17 using the TCP/IP protocol, wherein raw data RD, embedded in communication data KD, can be exchanged with the individual devices 2-10, 11 and 16.

The station 17 has a host computer 20, a first radio module 21 for communication with the barcode readers 11 in accordance with a WLAN standard, a second radio module 22 for communication with the ESL 2-10 according to a proprietary protocol, which is discussed in detail below, and a third radio module 23 for communication with the mobile user devices 16 according to a WLAN standard. The second radio module 22 is connected via a control cable 24 to the first and the third radio module 21, 23. The control cable 24 is part of a coupling of the second radio module with the other two radio modules 21, 23, and is implemented in two parts only because of the chosen placement of the radio modules 21-23. It should be noted, however, that in accordance with another exemplary embodiment, two separate control cables can be used. The control cable 24 is used to transmit a radio activity control signal, hereafter designated in short as control signal FS, from the second radio module 22 to the other two radio modules 21, 23, which is used to influence the radio activity of the other two radio modules 21, 23. In the present case the control signal FS is a signal in which a first level (0V or GND) indicates that no influence is present, and a second level (+2.5V or HIGH) indicates that an influence is present. In the implementation shown here, upon the occurrence of the second level and as long as the second level is present, the radio activity of the other two radio modules 21, 23 is suspended, thus no radio signals are broadcast (muted). Only in the presence of the first level do the other two radio modules have normal radio activity, in which they can broadcast radio signals. It should be mentioned at this point that between the radio modules, in order to implement the influencing, a serial or parallel data transmission system or else a data bus may also be present.

In addition, for each of the radio modules 21-23 the station 17 comprises an antenna 25-27 which can be used for the radio traffic of the station. Each of the radio modules 21-23 comprises the functional units (not shown in detail) that are necessary for the physical radio communication, implemented by means of their hardware and/or software, and is connected to its own antenna 25-27.

Each of the radio modules 21-23 has a serial interface 28-30 for wired communication with the host computer 20. The host computer is 20 is designed both for communicating with the radio modules 21-23 based on a serial communication protocol and also for TCP/IP-protocol-based communication with the server 18, wherein a raw data traffic between the server 18 and the respective radio module 21-23 is tunnelled from the one protocol to the other protocol. For this purpose, in addition to other functional stages that are not discussed in detail, the host computer comprises a conversion stage 31, which is implemented by means of software that runs on the hardware of the host computer.

The server 18 has a data storage stage 32, such as a database for storing all information concerning the stock management system and/or the communication with the individual subscribers of the radio network. In operation the server 18 implements a server process stage 33 for the provision of all server processes or functions. The server 18 also implements a virtual instance 34 of the station 17 for providing all station functionalities. For this process, on the server 18, by means of its hardware (CPU, memory, interfaces, etc.) an appropriate piece of software (a program) is processed, which enables the respective functionality to be provided. Due to the use of the virtual instance 34, the station 17 has a significantly reduced load with regard to its physical data processing resources, and the existing computing power of the server 18 is advantageously used for providing the "intelligence" of the station 17. Consequently, relatively inexpensive hardware can be used for the station 17.

In the present case, a single station 17 on the premises of the supermarket, for example on the ground floor, is assumed. If several stations 17 are used however, such as one per sales floor, it is a simple matter to generate other instances 35, 36 (indicated by blocks framed with dashed lines) on the server 18 in addition to the first instance 33, and to process the raw data traffic RD for the stations 17 (not shown) installed on the other floors (e.g. the first and the second floor). The system 1 is consequently scalable as desired, by adding multiple instances of a relatively inexpensive station 17. The implementation of the system 1 also allows the data traffic on the LAN to be kept constant.

Figure 2:
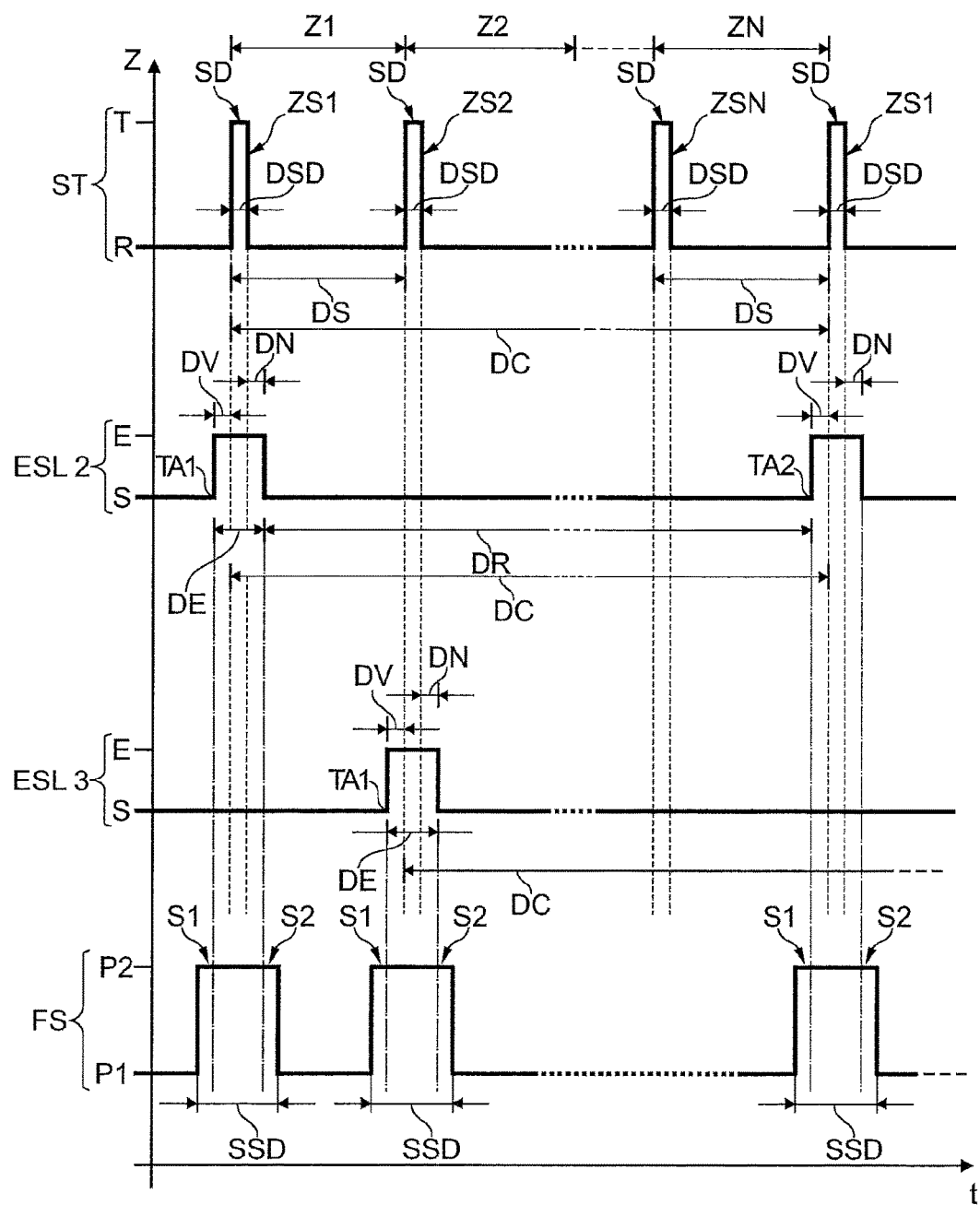
FIG. 2 a first state diagram.
Figure 3:
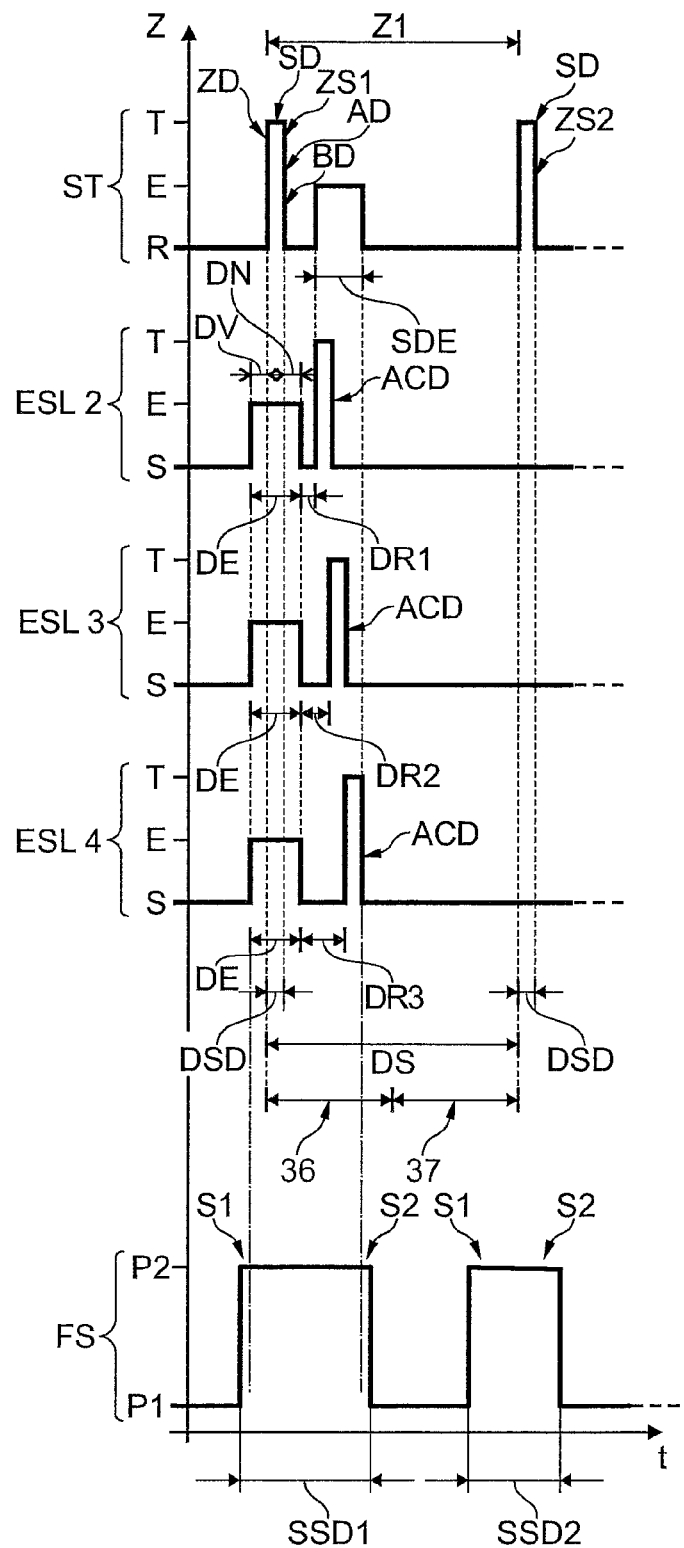
FIG. 3 a second state diagram.
Figure 4:
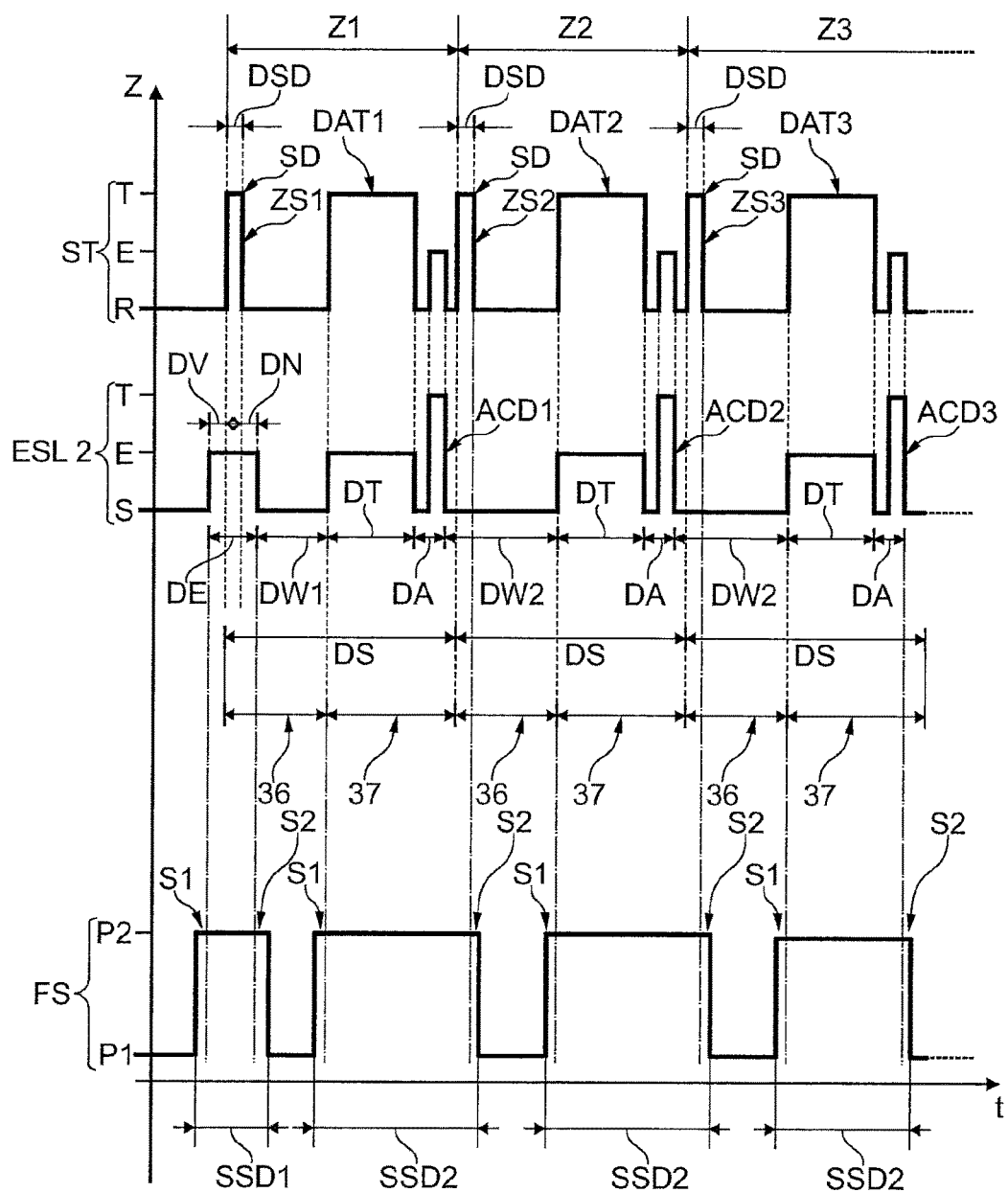
FIG. 4 a third state diagram.

In the communication between ESL 2-10 and the radio module 22 to which they are assigned, a time-slot communication method is used, the principle of which is represented in FIGS. 2-4, by means of which the functioning of the system is also illustrated. On the abscissa axis the time t is plotted. On the ordinate axis, states Z of the respective components or signals of the system 1 that are considered in the discussion are plotted. The graphs consequently show the temporal sequence of the states.

In each of FIGS. 2-4 the top state sequence shows the states of the second radio module 22 labelled as ST. During one time-slot cycle period DC (e.g. 15 seconds), N time slots Z1 ... ZN (e.g. 256) are available, with an identical time-slot duration DS (e.g. approx. 58 milliseconds). During the time-slot cycle duration DC the second radio module 22 switches between a sending state T and a resting state R. The sending state T is always occupied at the beginning of a time slot Z1 . . . ZN and maintained for a synchronization data-signal duration DSD (or send-time duration DSD of the synchronization data signal SD), in order to send a corresponding time-slot symbol, ZS1, ZS2, . . . ZSN with the respective synchronization data signal SD. For the corresponding time-slot cycle symbol ZS1 . . . ZSN, the ordinal number of the respective time slot Z1 . . . ZN in the order of occurrence of the time slot Z1 . . . ZN can be used.

FIG. 2 shows that the first ESL 2 is in the synchronous state. It wakes up from its extremely energy-saving sleep state S at a first wake-up time TA1, and with a relatively short lead time DV prior to an expected occurrence of a synchronization data signal SD, changes into its receiving-ready state E, receives the synchronization data signal SD during a reception period DE with the first time-slot symbol ZS1, then by comparing the least significant byte B0 of its hardware address with the received time slot symbol ZS1 establishes that the first time slot Z1 intended for the first ESL 2 is displayed (agreement between the bytes: B0 of the hardware address and the first time slot symbol ZS1 to be compared), retains the parameters used for controlling the wake-up for waking up in the subsequent time-slot cycle for the purpose of defining the new wake-up time point, and changes back into the sleep state S with a relatively short follow-on time DN, in order to wake up on schedule after expiry of the sleep-state dwell time DR provided at the new (second) wake-up time TA2 with said lead time DV before the fresh start of the first time-slot cycle Z1. The same applies analogously for the second ESL 3 and for all other ESL 4-10, provided they are in the synchronous state as was the first ESL 1. All ESL 2-10 are designed to detect a non-synchronous state and to synchronize themselves.

The last (bottom) state sequence plotted in FIG. 2 shows the control signal FS changing between the first level P1 and the second level P2. Every time the second radio module 22 tries to send the synchronization data signal SD, the other two radio modules 21, 23 are muted by means of the second level P2 of the control signal FS, so that they show no radio activity. The time period (muting period SSD), during which the muting occurs, could in principle be limited to the period of time of the occurrence of the synchronization data signal SD. Preferably, the muting period SSD is extended by a short lead time (first safety period S1), in particular also by a short follow-on time (second safety period S2) of a few milliseconds, in order to ensure that the synchronization data signal DS always occurs within the muting period SSD. However, the duration of the existence of the second level P2 (muting period) particularly preferably also overlaps or spans (including lead-time and follow-on time) the receiving period DE, thus ensuring that no interference occurs in the radio medium which could adversely affect the reception and consequently also the checking of the synchronism of the ESL 2-10. In the last mentioned implementation it would also be sufficient if the muting period SSD coincides with the receiving period and is consequently equal in length, because in the receiving period DE the lead time DV and the run-time DN is already taken into account in relation to the expected occurrence of the synchronization data signal SD.

By reference to FIG. 3 an individual addressing of the ESL 2-4 and an individual control of these ESL 2-4 using simple time-slot commands will be discussed. The figure shows only the first time slot Z1 embedded between two synchronization data signals SD. In the synchronization data signal SD of the first time slot Z1, address data AD, command data CD and confirmation time data ZD are embedded by the second radio module 22. The address data AD (e.g. hex B2:00:01) are used to individually address the first ESL 2, the address data AD (e.g. hex B2:00:02) to address the second ESL 3 and the address data AD (e.g. hex B2:00:03) to address the third ESL 4. Using the command data CD, a "ping" command is sent to the first ESL 2, a "ping" command is also sent to the second ESL 3 and a "SWPAG2" command to the third ESL 4. These commands are single time-slot commands, which are processed with negligible time delay in the relevant ESL 2-4 immediately after their decoding. The two "ping" commands are used to test whether the addressed ESL 2, 3 responds with confirmation data ACD, i.e. whether it exists or responds at all and is synchronized. The "SWAPG2" command is used to cause the third ESL 4 to switch from one (first) current memory page to a second memory page, in order, for example, to change the image to be displayed by means of its display screen. In addition, with the synchronization data signal SD a confirmation time point for the first ESL 2 is transmitted by specifying a first rest period DR1, for the second ESL 3 by specifying a second rest period DR2 and for the third ESL 4 by specifying a third rest time DR3. The reference point for the three rest periods DR1-DR3 is always the end of the receiving period DE. In place of the individual rest periods DR1-DR3, maximum time periods for responding can also be specified, which are obtained from the sum of the respective rest periods DR1-DR3 and the time period for outputting the confirmation data ACD. In accordance with FIG. 3, all three ESL 2-4 detect that they are synchronous, because the first time slot symbol Z1 displays the time slot specified for them (least significant byte B0 of the hardware address is hex 00 in all three of the ESL 2-4). The testing of the address data AD indicates that each ESL 2-4 is individually addressed (presence of the remaining three bytes B1-B3 of the respective hardware address in the address data AD), the commands intended for the respective ESL 2-4 are decoded and immediately executed, and also the individual confirmation data ACD after the expiry of the individual rest periods DR1 . . . DR3 after the end of the receiving period DE are transmitted to the second radio module 22, which is ready to receive the confirmation data ACD during a station receiving period SDE. The complete processing of single time-slot commands, including the communication of the confirmation data ACD, takes place in a first part 36 of the time slot Z1, so that a second part 37 is available for other tasks such as the processing of multiple time-slot commands, which will be described in further detail below.

By analogy to FIG. 2 the last (bottom) state sequence plotted in FIG. 3 also shows the control signal FS changing between the first level P1 and the second level P2. In the present case, however, the duration of a first muting period SSD1 is longer than the duration of a second muting period SSD2, because in the region of the first muting period SSD1 a longer interference-free communication phase is necessary. The duration of the second muting period SSD2 corresponds to that period shown in FIG. 2, because only the receiving period DE has to be taken into account.

FIG. 4 shows the processing of a multiple time-slot command, in which the first ESL 2 receives overall data (e.g. relating to an entire display image or even just one image plane of the image) across three consecutive time slots Z1-Z3, decomposed into three data packets DAT1-DAT3 from the second radio module 22. The first ESL 2 detects its synchronous state by means of the synchronization data signal SD and the fact that it is being addressed individually (addressee hex B2:00:01), receives and decodes a "DATA_INIT" command, with which it is commanded to receive the three packets DAT1-DAT3 in said time slots Z1-Z3, and at the end of the receiving period DE goes into the sleep state S for a first waiting period DW1, wherein the first waiting period DW1 expires at the end of the first half of the time-slot duration DS. At the beginning of the second part 37 of the first time slot Z1 the second radio module 22 goes into its transmit state T and the first ESL 2 goes into its receive-ready active state E, so that during a data transmission period DT it receives the first data packet DAT1. Then, by means of partial confirmation data ACD1 during a confirmation period DA, during which the second radio module 22 is also in the receive state E, it confirms the successful reception. The confirmation period DA ends before the end of the first time slot Z1. After expiry of the confirmation period DA, the first ESL 2 waits for a second waiting period DW2, which extends up to the end of the first part 36 of the second (subsequent) time slot Z2, in the sleep state S. At the beginning of the second part 37 of the second time slot Z2 the second radio module 22 goes into its transmit state T and the first ESL 2 goes into its receive-ready active state E, so that during a data transmission period DT it receives the second data packet DAT2. The same applies to the third time slot Z3, at the end of which the data transfer is completed. Each successfully transmitted data packet DAT1-DAT3 is confirmed using the partial confirmation data ACD1-ACD3.

By analogy to FIG. 2 the last (bottom) state sequence plotted in FIG. 4 also shows the control signal FS changing between the first level P1 and the second level P2. In the present case, however, the duration of a first muting period SSD1 is shorter than the duration of a second muting period SSD2, which in the present case occurs several times in succession. The duration of the first muting period SSD1 corresponds to the duration shown in the FIG. 2, which is favourable for an interference-free reception of the synchronization data signal SD. During the second muting period SSD2, an interference-free radio traffic is provided for handling a plurality of communication events occurring one after another in close succession.

Quite generally, in conclusion it should be mentioned that in relation to time slots to which no electronic price signs are assigned, no muting of the other two radio modules 21, 23 is preferably carried out. This means that the communication efficiency of the entire radio network is improved.

In accordance with another exemplary embodiment of the invention, a predefined, graduated hierarchy can also be provided for the radio activities of the radio modules. This can involve, for example, a first radio module having the highest priority, a second radio module having lower priority and possibly a third radio module having the lowest priority. In this exemplary embodiment, the second radio module can only influence the third radio module with regard to its radio activity, whereas the first radio module can influence the other two radio modules with regard to their radio activities. The third radio module cannot exert any influence on the radio activity of the other radio modules.

To conclude, it will once again be pointed out that the Figures described in detail above are merely exemplary embodiments which can be modified in a wide variety of ways by the person skilled in the art without departing from the scope of the invention. For the sake of completeness, it is also pointed out that the use of the indefinite article "a" or "an" does not exclude such features from also being present more than once.

The invention claimed is:

1. A communication system (1), comprising:
    a radio base station (17); and
    at least one electronic price indication sign (2-10), wherein the radio base station (17) includes:
        a first radio module (21, 23) for radio communication with a first radio communication device (11, 16) assigned thereto;
        a second radio module (22) for radio communication with at least one electronic price indication sign (2-10) assigned thereto; and
    a coupling (24) coupling the first radio module (21, 23) and second radio module (22) to each other, and
        the second radio module (22) influences the radio activity of the first radio module (21) through the coupling (24), and
        the first radio module (21, 23) is influenced with regard to the radio activity of the first radio module (21, 23),
    wherein the second radio module (22) also communicates with the at least one electronic price indication sign (2-10), and wherein, during the communication with the at least one electronic price indication sign (2-10), a time-slot communication method is applied, in which in a recurring sequence a number of time slots (Z1-ZN) are available for communication per time-slot cycle, wherein each time slot of the number of time slots (Z1-ZN) is identified by a unique time slot symbol (ZS1-ZSN), and
        wherein outside of the time slot (Z1-ZN) allotted to a respective price indication sign of the at least one price indication sign (2-10), the respective price indication sign (2-10) is operated in an energy-saving sleep mode, wherein in the energy-saving sleep mode only those activities that are needed for a timing for timely wake-up are carried out, so that the respective price indication sign (2-10) is ready by a next time slot of the number of time slots (ZI-ZN) allotted to it for receiving the time slot symbol (ZS1-ZSN), to establish its synchronous state with the second radio module (22).

2. The communication system (1) according to claim 1, wherein the second radio module (22) is designed to generate and output a radio activity control signal (FS) to the first radio module (21, 23) and the first radio module (21, 23) is designed for receiving and evaluating the radio activity control signal (FS) with regard to its information content and for influencing the radio activity thereof in accordance with the information content.

3. The communication system (1) according to claim 1, wherein the coupling (24) is implemented by means of a cable or cabling system between the first radio module (21,23) and the second radio module (22).

4. The communication system (1) according to claim 1, wherein the first radio module (21, 23) is influenced by the second radio module (22) such that the first radio module (21,23):
    suspends its radio activity, and/or
    resumes its radio activity, and/or
    suspends its radio activity during a predefined time period or in accordance with a time period defined by the second radio module (22), and/or
    adjusts its transmission power automatically to a predefined value or adapts its transmission power to a value defined by the second radio module (22), and/or
    adapts its radio channel assignment according to a predefined scheme, or to a scheme defined by the second radio module (22).

5. The communication system (1) according to claim 1, wherein the first radio module (21, 23), which can be influenced with regard to the radio activity first radio module (21, 23), is designed to communicate in accordance with a WLAN standard with WLAN-enabled radio communication devices (11, 16), or to communicate with electronic price indication signs (2-10) as radio communications devices.

6. The communication system (1) according to claim 1, wherein the second radio module (22) is designed to predictively determine a time at which the influencing occurs.

7. The communication system (1) according to claim 6, wherein the time at which the influencing occurs is specified on a basis of an expected time at which a communication occurs between the at least one electronic price indication sign (2-10) and the second radio module (22).

8. The communication system (1) according to claim 1, further comprising a host computer (20) coupled through a wired computer network (19) to a server (18) and designed to exchange data between the server (18) and the first radio module (21,23) and the second radio module (22), wherein the host computer (20) is designed:

for transmitting data between the server (18) and the host computer (20) based on a TCP/IP network protocol, and between the first radio module (21,23) and the second radio module (22) and the host computer (20) based on an interface protocol, and for tunneling raw data traffic between the first radio module (21,23) and the second radio module (22) and the server (18).

9. The communication system (1) according to claim 1, comprising:

a server (18) coupled to the radio base station (17) for providing or processing data relating to communication with the first radio module (21, 23) and the second radio module (22).

10. The communication system (1) according to claim 9, wherein the server (18) provides a virtual instance (34; 35, 36) of a radio base station, and the radio base station (17) tunnels a raw data traffic (RD) stream between the first radio module (21,23) and the virtual instance (34; 35, 36) of the radio base station.

* * * * *

UNITED STATES PATENT AND TRADEMARK OFFICE
CERTIFICATE OF CORRECTION

| | |
|---|---|
| PATENT NO. | : 10,742,252 B2 |
| APPLICATION NO. | : 15/512311 |
| DATED | : August 11, 2020 |
| INVENTOR(S) | : Andreas Roessl |

It is certified that error appears in the above-identified patent and that said Letters Patent is hereby corrected as shown below:

In the Claims

In Column 14, Line 65, Claim 5, before the phrase "first radio module...", please insert the phrase -- of the --.

Signed and Sealed this
Thirteenth Day of June, 2023

Katherine Kelly Vidal
*Director of the United States Patent and Trademark Office*